(No Model.)
M. CONRAD & C. HOTZ.
WAGON HUB.
No. 355,141. Patented Dec. 28, 1886.
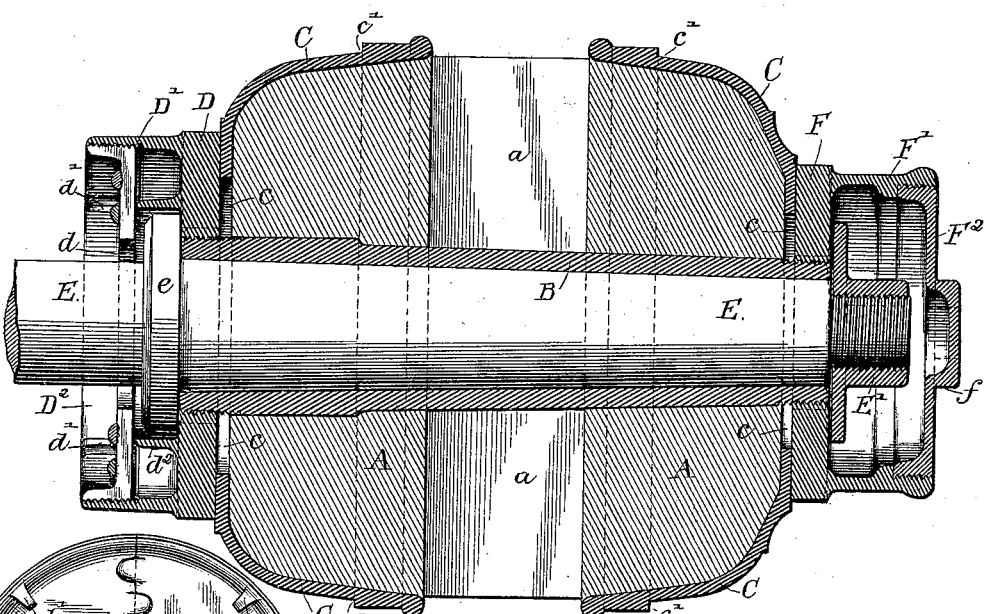
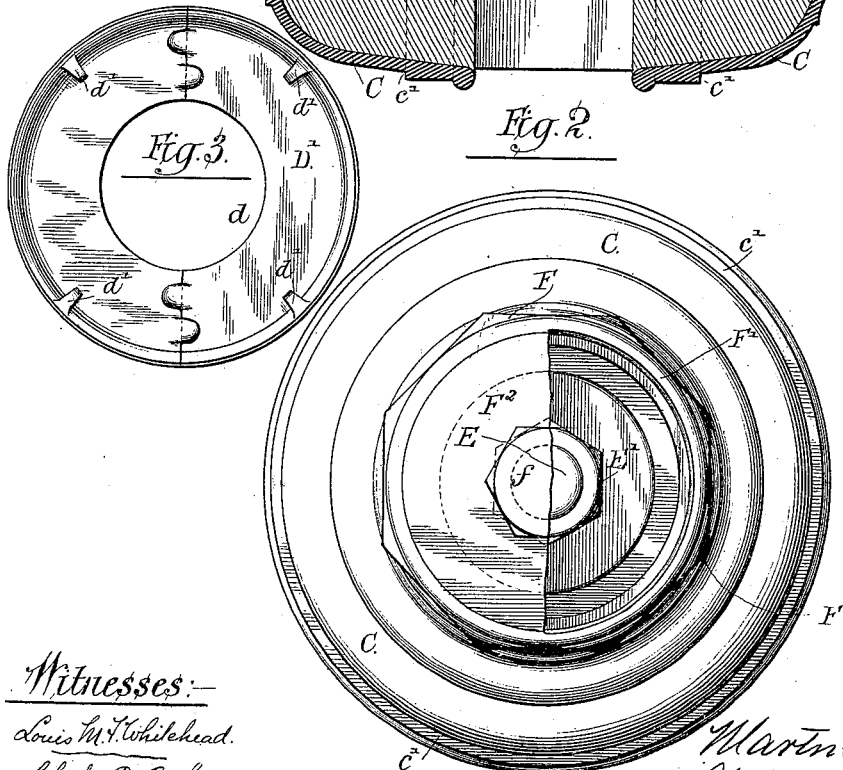
Witnesses:
Louis M. F. Whitehead.
Charles E. Fisher.
Inventor:
Martin Conrad
Christoph Hotz
by M. E. Dayton
Attorney

UNITED STATES PATENT OFFICE.

MARTIN CONRAD AND CHRISTOPH HOTZ, OF CHICAGO, ILLINOIS.

WAGON-HUB.

SPECIFICATION forming part of Letters Patent No. 355,141, dated December 28, 1886.

Application filed April 26, 1886. Serial No. 200,122. (No model.)

*To all whom it may concern:*

Be it known that we, MARTIN CONRAD and CHRISTOPH HOTZ, both of Chicago, in the county of Cook and State of Illinois, have invented certain new and useful Improvements in Wagon-Hubs; and we do hereby declare that the following is a full, clear, and exact description thereof, reference being had to the accompanying drawings, and to the letters of reference marked thereon, which form a part of this specification.

Our invention relates, primarily, to what may be called "iron-clad" or "metal-cased" wooden wagon-hubs. It has for its principal object to more conveniently and perfectly secure the several parts of the hub and casing together, and generally to provide an improved construction in such hubs.

Referring to the drawings, Figure 1 is an axial section of a hub and its adjuncts complete when constructed in accordance with our invention. Fig. 2 is a view of the outer end of the hub with the sand cap or guard partly broken away. Fig. 3 shows the inner sand-cap constructed in halves.

A represents the wooden portion or hub proper, in which are cut the mortises $a$ for the spokes.

B is the box-skein fitted to the bore of the hub, and provided with lengthwise ribs (not shown) near its inner end, in the usual manner. It projects beyond the wooden body A of the hub at both ends, and is exteriorly screw-threaded on its projecting ends.

C C are cup-shaped malleable-iron or other metal caps or shells, interiorly fitted to closely fit the surface of the hub A externally to the spokes, and having openings $c$, through which the ends of the box B project.

D is a nut, interiorly threaded to fit the inner end of the box B, and larger than the opening $c$ of the adjacent shell C, so that when run up to place it bears against said shell, substantially as shown. The nut D is provided with a cylindric flange, D', which forms the inner sand-band of the wheel.

$D^2$ is a diametrically-divided cap or sand-guard, screw-threaded upon its periphery to fit a corresponding thread upon the interior of the sand-band D', and having, when its halves are joined, a central hole, $d$, by which it may embrace the axle E. The cap is provided with suitable ribs or other projections, as $d'$, by which it may be run into and out of the sand-band by a proper wrench for the purpose. Any suitable stop may be provided for the cap $D^2$ to shoulder against—as, for example, an annular flange, $d^2$, cast on the nut D in position to give necessary clearance for the spindle-collar $e$.

F is a nut similar to the nut D, and fitted to screw upon the outer end of the box-skein B, and to bear at its margin against the outer shell, C. The nut F is provided with a concentric flange, F', which forms the outer sand-band of the hub, and $F^2$ is a cap or sand-guard which may be fitted to screw into said band to more perfectly exclude grit and dirt from the spindle and nut bearings, being preferably provided with a squared boss, $f$, to receive the same wrench that turns the spindle-nut E'.

The guard-caps $D^2$ and $F^2$ may or may not be used, as preferred.

In making the hub composed of the parts described in the manner best calculated to insure the advantages sought to be obtained, a body of thick oil-mixed lead or paint is first applied between the hub and the shells C C, and the latter are then pressed with great force upon the hub-body A. To facilitate the operation of thus pressing the shells upon the wood, an annular shoulder, $c'$, is provided near the margin of each shell, which affords a direct bearing engagement for a suitably-constructed press. The box B may have been previously or may be subsequently inserted into the hub, and after both the shells and the box are in place a quantity of oil-mixed lead is placed in the annular spaces $c$, and the nuts D and F are then screwed firmly upon the box and against the shells C C. By these means the ends of all the pores of the wood portion A of the hub are completely and hermetically closed to the exclusion of all moisture and air, and at the same time by the screw-threaded connection of the nuts or end plates, D and F, with the box-skein B the oil or grease with which the spindle is lubricated is wholly prevented from entering the hub outside the box. No portion of the wood is exposed, except between the spokes, and this part of the wood surface, being lengthwise of the grain or pores, is not liable to decay or injury.

To specially guard the spindle-bearings from sand and grit, the sand-guards D² and F² may, if desired, be employed; but they may be obviously omitted without departure from our invention.

We claim as our invention—

1. The combination, with a wood hub-body, of a box-skein projecting and screw-threaded at both its ends, nuts fitted to the threaded ends of the box and provided with flanges forming sand-bands at both ends of the hub, and separate metal shells covering and closely embracing the ends and adjacent lateral surfaces of the hub, and extending inwardly between the nuts and ends of the hub, substantially as described.

2. The combination, with the inner nut having a sand-band cast integral therewith, of a two-part sand guard or cap screw-threaded to the margin of the sand-band, substantially as described.

In testimony that we claim the foregoing as our invention we affix our signatures in presence of two witnesses.

MARTIN CONRAD.
CHRISTOPH HOTZ.

Witnesses:
LOUIS SCHIFFLIN,
F. F. KRAUSE.